United States Patent [19]

Amstutz

[11] Patent Number: 4,592,194
[45] Date of Patent: Jun. 3, 1986

[54] PROCESSING APPARATUS FOR STALK-SHAPED AGRICULTURAL PRODUCTS

[75] Inventor: Jean-Pierre Amstutz, Birr, Switzerland

[73] Assignee: Bucher-Guyer AG, Niederweningen, Switzerland

[21] Appl. No.: 630,083

[22] Filed: Jul. 12, 1984

[30] Foreign Application Priority Data

Aug. 15, 1983 [CH] Switzerland ............. 4433/83

[51] Int. Cl.⁴ .................................... A01D 43/00
[52] U.S. Cl. ............................ 56/16.4; 56/13.6; 56/192; 56/DIG. 1
[58] Field of Search ........... 56/16.4, 13.6, DIG. 1, 56/192, 364, 14.5

[56] References Cited

U.S. PATENT DOCUMENTS

| | | | |
|---|---|---|---|
| 2,872,772 | 2/1959 | Nole | 56/364 |
| 3,699,755 | 10/1972 | Hauser | 56/DIG. 1 |
| 3,747,313 | 7/1973 | Denzin | 56/364 |
| 3,785,132 | 1/1974 | Wilson | 56/364 |
| 4,398,384 | 8/1983 | Klinner | 56/DIG. 1 |

FOREIGN PATENT DOCUMENTS 2730211 2/1978 Fed. Rep. of Germany ... 56/DIG. 1

*Primary Examiner*—Jay N. Eskovitz
*Attorney, Agent, or Firm*—Marmorek, Guttman & Rubenstein

[57] ABSTRACT

A processing apparatus for agricultural stalk-shaped products, and wherein the products are adapted to be formed into a stream of products following cutting thereof from the ground, includes a rotatably driven conveyor element with a plurality of approximately radially outwardly extending conveyor tools separated from one another by gaps, and operatively defining a trajectory, a guidance element defining a plurality of openings, cooperating with the conveyor element for guiding the products, and forming with the conveyor element a guidance channel extending transversely to the stream of products, and wherein the guidance element intersects the trajectory near the front end and near the rear end of the guidance channel, so that the conveyor tools project at least partially outwardly through corresponding openings in the guidance element.

18 Claims, 7 Drawing Figures

PROCESSING APPARATUS FOR STALK-SHAPED AGRICULTURAL PRODUCTS

BACKGROUND OF THE INVENTION

The invention relates to a processing apparatus for agricultural stalk-shaped products provided with rotatably driven conveyor means, and including a plurality of approximately radially outwardly extending conveyor tools separated from one another by gaps, and guidance means cooperating with the conveyor means for guiding the products, and forming with the conveyor means a guidance channel extending transversely to a stream of the agricultural products being conveyed through the apparatus.

Such devices have proven themselves during harvest of hay, and the preparation of fodder in silos. Due to an accelerated drying process the harvest time is shortened considerably, which permits a rational working operation for farmers.

Various constructions of processing devices are known, where the processing device is based on a conveyor drum and a guidance device arranged at distance from the conveyor drum.

According to DO No. 20 04 285 the conveyance channel formed by the conveyor drum and the guidance element is provided with baffle plates rigidly secured to the guidance element, the baffle plates extending within the conveyance channel transversely to the conveyance stream of the stalked-shaped products.

The stream of stalk-shaped products passing through the conveyance channel by means of the conveyance drum is scraped in a shock-like manner by these baffle plates.

In the mower device according to DO No. 21 47 375 the guidance element is arranged to be displaceably secured within the region of the entrance to the guidance channel. The degree of intensity of processing of the stalk-shaped agricultural products at the entrance of the conveyance channel is accomplished by its selectably adjustable inlet cross-sectional area, as well as by the position of the inlet edge on the guidance element.

German Pat. DA No. 21 32 134 discloses an alternate embodiment of a baffle board, which has been shown advantageous in practice. The guidance element above the conveyance drum is provided with a cam-like rake, which extends over the entire width of the conveyor drum, and which permits a selectable change of the cross-sectional area of the conveyance channel due to its adjustability, to such an extent that the prongs can extend between the conveyor elements of the conveyor drum.

By means of this construction it is possible to match the degree of scraping to the passage of the cut products, or the fodder.

It has nevertheless been shown that due to the high impact effect of these known mechanisms largely only partial scraping of the cut agricultural products or of the fodder can be achieved, and wherein losses are unvoidable due to the knocking off of leaf portions. This disadvantage is not only caused by the formation of, and cooperation of the conveyor drum with the baffle plate, but also by the relatively large rotational velocity of the conveyor drum.

SUMMARY OF THE INVENTION

It is accordingly an object of the present invention to obviate the disadvantages of the prior art and to devise a processing apparatus which, on one hand, facilitates acceptance of the cut products, and on the other hand, subjects the products to a suitable scraping effect, and minimizes any wasteful loss of the cut products.

According to the present invention, this object is attained by the guidance element intersecting the trajectory of the conveyor tools near the front end and near the rear end of the guidance channel, so that the conveyor tools project at least partly outwardly through corresponding openings in the guidance element.

Due to this implementation the cut products can be processed more carefully than has been possible hitherto, and this manner of processing has a particularly favorable effect on the tender leaves of the stalks.

Instead of primarily an impact effect being obtained, there is obtained an increased friction resistance in the conveyance channel, so that the protective layer of the cut products is subjected to an increased scraping effect. This process also decreases any losses from crumbling. Furthermore the number of revolutions of the conveyor element can be reduced to a great extent without, however, impairing the capability of the apparatus to receive the cut products.

Advantageously the guidance element extends along a longitudinal direction, and a tangent to the trajectory near the front end of the guidance channel advantageously forms an acute angle alpha with the direction of the guidance element thereat, so that a steady stream of the cut goods is maintained.

It has been shown to be particularly advantageous if a mower is disposed operatively upstream of the conveyor element, as a result of which one operating process is saved. Known versions of a mower, such as a drum mower, a disk mower, a band mower or a finger-type mower are suitable for this application.

The conveyor tool has an operative side adapted to come into contact with the products, and so as to increase the scraping effect, the operative side of the conveyor tool may be provided with a rough surface adapted to scrape the products.

It is particularly advantageous if each conveyor tool has a radially outwardly converging end. In this implementation adjoining conveyor tools form a wedge-like gap, as a result of which during passage of the cut products through the narrowing conveyance channel an increased friction is exerted from all sides on the cut products.

The outwardly converging end of each conveyor tool has an operative side, and a side opposite thereto, and it is particularly advantageous if each side has a rough surface, so that the cut products are subjected to an increasing friction as they pass through the conveyance channel, whose cross-sectional area is decreasing during the passage of the products therethrough.

The openings are advantageously slits subdividing the guidance element into a plurality of strips, and it is particularly advantageous if a reinforcing rib is provided on each strip, as the reinforcing strips can withstand an increased stress resulting from the narrowing conveyance channel.

It is advantageous if the guidance element is provided with an inner side formed with a rough surface, as the cut products passing through the conveyance channel are more intensively scraped thereby from above.

The guidance channel defines a height, and it is particularly advantageous if the guidance element is spaced at a selectable average distance from the conveyor element, so that the height of the guidance channel is adjustable. In this implementation the processing can be tailored to the consistency of the cut products.

For the purposes of assembly and disassembly it is advantageous if the guidance element is releasably connected to the conveyor element; it may, alternatively be hingeably connected to the conveyor element.

It is advantageous if a cover is provided for normally covering the openings in the guidance element; this largely reduces the possibility of any accidental injury.

So as to prevent any accumulation of the cut products passing through the openings or slits below the cover, the rear end of the cover may be formed with a discharge aperture.

Advantageously entrainment means may be disposed between adjoining conveyor tools of the conveyor element, which project into the guidance channel; this feature facilitates acceptance of the cut products, and their further transport.

In order to facilitate transport of the cut products within the guidance channel, a guide drum may be provided within the conveyor element, and be disposed concentrically with the axis of rotation of the conveyor element; the conveyor tools are advantageously affixed to the mantle of the guide drum.

BRIEF DESCRIPTION OF THE DRAWINGS

For a fuller understanding of the nature and objects of the invention, reference should be had to the following detailed description, taken in connection with the drawings, in which.

DESCRIPTION OF THE PREFERRED EMBODIMENTS

Figure 1:
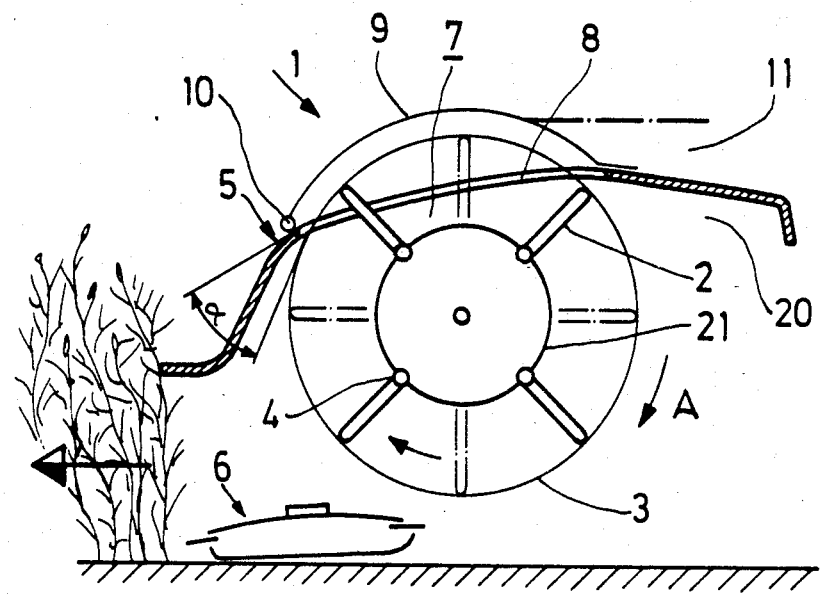
FIG. 1 is a longitudinal section through the apparatus according to the present invention, equipped with a disk mower.

Referring now to the drawing, in FIG. 1 there is shown a processing machine or apparatus 1 for agricultural stalk-shaped products. The processing apparatus 1 includes a conveyor member 3 driven along the direction of the arrow A, and is provided with conveyor tools 2. Above the points 4, normally implemented as hinged, but which alternately may also be rigid, the processing apparatus is provided with guidance means 5, whose front end, as seen in the normal direction of movement of the machine extends into a region of still standing stalks, which it preferably bends forwardly; a disk mower 6 is disposed ahead of the conveyor member 3.

The conveyor member 3 forms a conveyor channel 7 together with the guidance means 5, and wherein the conveyor member 3, as seen in the elevation view of FIG. 1, intersects the guidance means 5 at its front and rear ends, respectively, in such a manner that the conveyor tools 2 project at least partially through openings or slits 8 formed in the guidance means 5, the slits 8 cooperating with the conveyor tools 2. Due to the passage of the conveyor tools 2 through the slits 8 the conveyor channel 7 is initially somewhat narrowed, as a result of which the stalks are engaged with increased friction from all sides. Due to the subsequent widening of the conveyor channel 7 the cut stalk products used as fodder is again loosened, and deposited in a loose state on the ground. So as to ensure a continuous conveyance stream, free from being clogged, a tangent to the trajectory of the conveyor tools 2 subtends an acute angle alpha with the guidance means 5 at the front end of the conveyance channel.

So as to guard against any injuries there is releasably provided a protective cover 9 above the guidance means 5 so as to cover the slits 8. For simplicity's sake the cover 9 may be hinged by means of a hinge 10 to the processing apparatus 1. In this manner any cut stalks passing through the slits 8 can easily be removed from the processing apparatus 1.

Alternatively the cover 9 could be provided with an opening 20 near a rearward end thereof, so that any cut products passing from the conveyance channel 7 through the slits 8 can leave the space below the cover 9.

Figure 2:
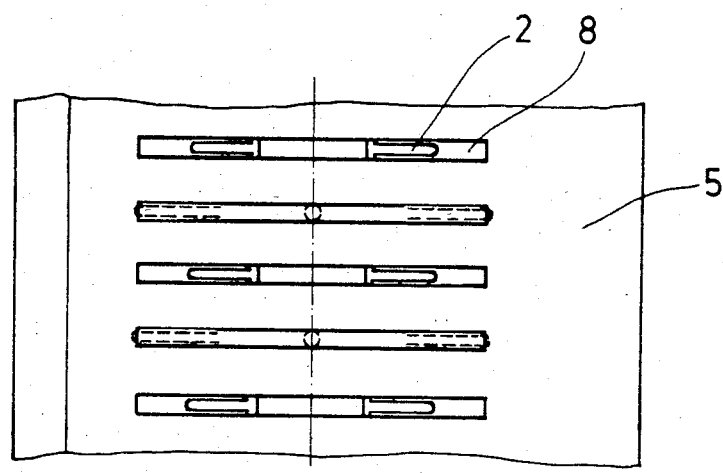
FIG. 2 is a fragmentary plan view of the apparatus according to FIG. 1.

In FIG. 2 the arrangement of the slits 8 on the guidance means 5 is illustrated in greater detail.

Figure 3:
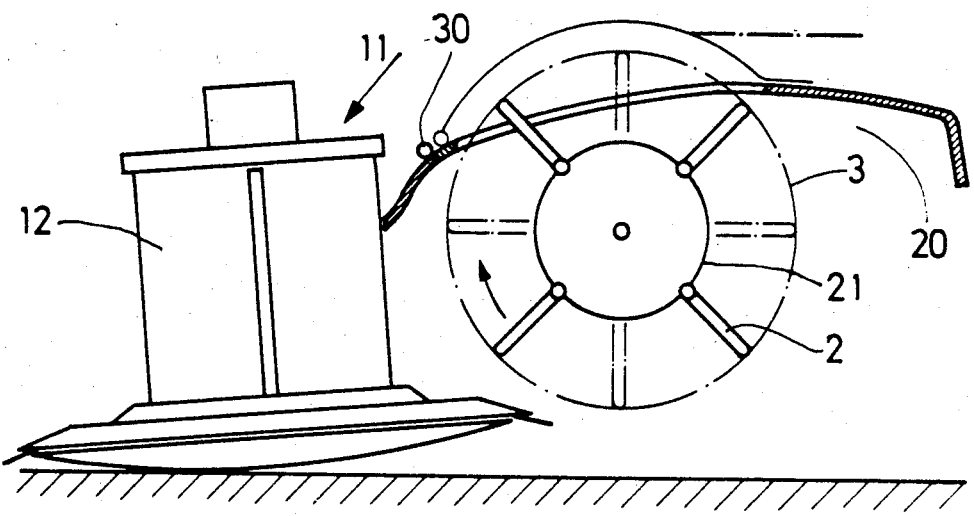
FIG. 3 is a longitudinal section through the apparatus according to the present invention, equipped with a drum mower.

In FIG. 3 there is shown a processing apparatus 1, ahead of which there is arranged a drum mower 11. The conveyor member 3 is shifted slightly rearwardly due to the drum elements 12 disposed on the mower 11, without the conveyance stream being impaired thereby.

To the front end of the guidance means 5 there is connected a hinge 30, so that the rear part of the guidance means 5 may be lifted.

Figure 4:
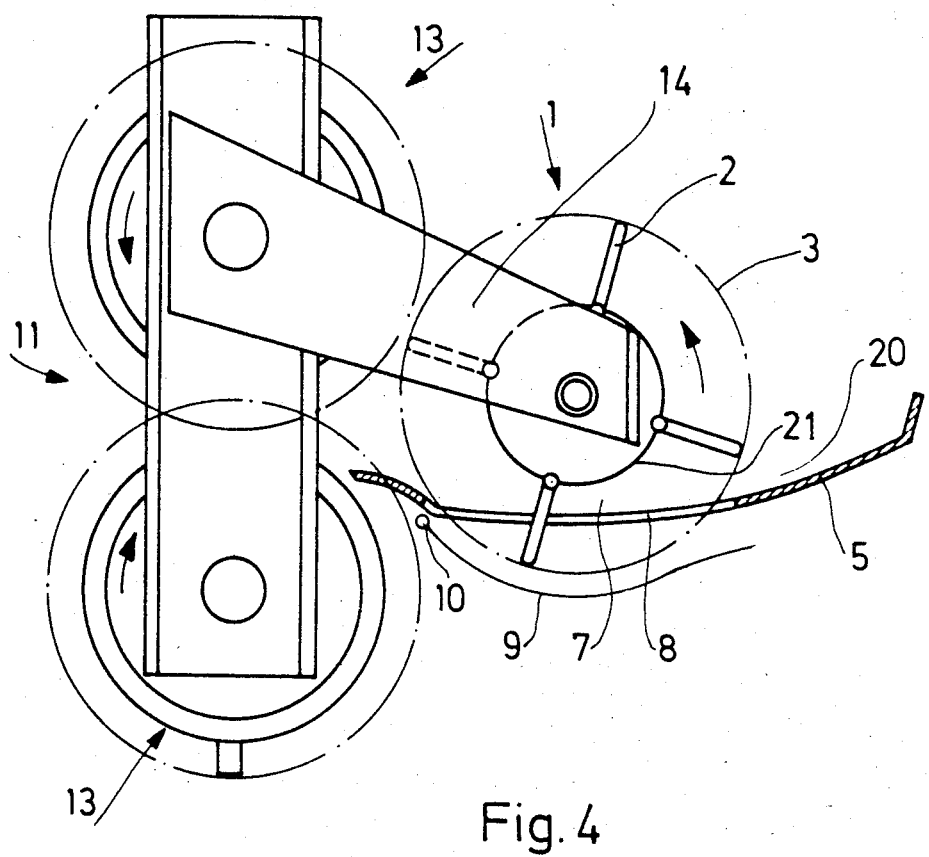
FIG. 4 is a plan view of a machine equipped with a drum mower, and a processing apparatus for agricultural stalk-shaped products, which may be rotated about a vertical axle.

In FIG. 4 there is shown a processing apparatus 1, in which the rotating axle thereof is disposed upright, or approximately parallel to the rotating axles of the drum mower 11. The remaining elements are arranged with respect to the processing apparatus 1 in a manner similar to the arrangement illustrated in FIG. 1, and wherein the conveyance channel 7 is so arranged, that its front end communicates with a conveyance region located between the drum mowers 11. A connection between the drum mowers 11 and the processing apparatus 1 is established by means of a connecting arm 14.

Figure 5:
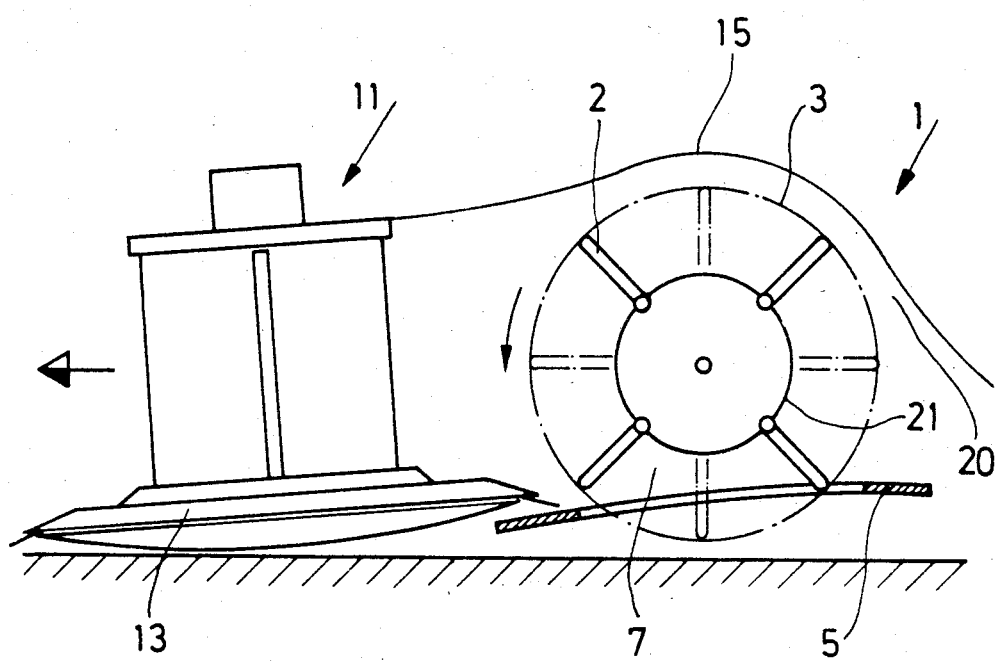
FIG. 5 is an elevation view of a processing apparatus for agricultural products, and having a conveyance channel located below a conveyor wheel.

An alternative embodiment of a processing apparatus 1 cooperating with a drum mower 11 is illustrated in FIG. 5. The processing apparatus 1, which is located downstream of the drum mower 11 is provided with a conveyance channel 7 located substantially below the conveyor member 3. The substantially flat guidance means 5 extends with its front end up to the cutters 13, while the conveyance member 3 rotating near the conveyance channel 7 along a direction opposite to the direction of movement of the machine, as illustrated in the drawing, moves the cut stalks through the conveyance channel 7. To provide protection against any injuries, the conveyor member 3 is covered by a cover 15.

Figure 6:
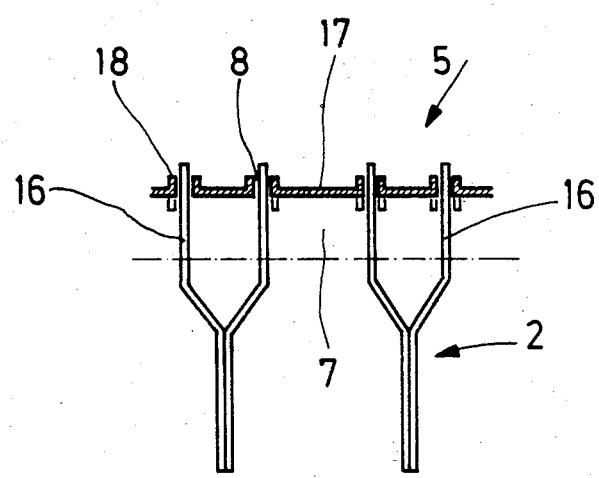
FIG. 6 is a fragmentary cross-section of the apparatus, according to the present invention, showing the conveyor tools within the conveyance channel.

In FIG. 6 there is shown an embodiment of the conveyance tools 2 cooperating with the guidance means 5. The Y-shaped forked arms 16 of the conveyor tools 2 extend outwardly through the recesses 8 of the guidance means 5. The strips 17 formed in the guidance means 5 by the recesses 8 are reinforced by reinforcement ribs 18, so as to be able to accomodate the pressure resulting from the narrowing of the conveyance channel 7. The reinforcement ribs 18 can be provided either on the inner sides or on the outer sides of the strips 17, and extend along the longitudinal direction thereof.

Figure 7:
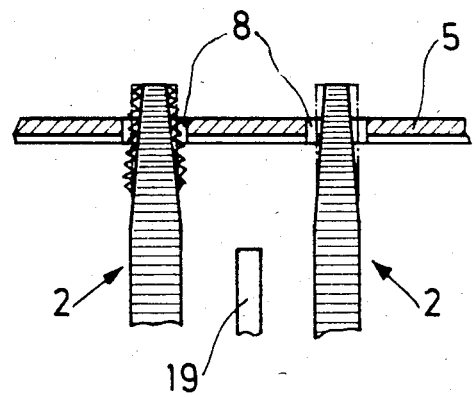
FIG. 7 is a fragmentary cross-section corresponding to that of FIG. 6, but showing an alternate embodiment of the conveyor tools.

In FIG. 7 there is shown a further embodiment of the conveyor tools 2. The tools 2 are implemented in prism-like shape according to the dash-dot line, but alternately may also be conically divergent in an outward direction. In this alternate version the slits 8 must be shaped in such a manner that the conveyor tools 2 do not come into contact with the guidance means 5 laterally even at a greater immersion depth of the tools 2 into the guidance means 5. Due to the conical ends of the conveyor tools 2 and the pressure exerted on the cut stalks by the guidance means 5, higher frictional forces are exerted on the cut stalks, and wherein this frictional effect can be even further enhanced by improving the friction coefficient by roughening the contact surfaces.

Scraping of the cut stalks is intensified, if the inner side of the guidance means 5 is provided with a rough or coarse surface; this intensification of the scraping effect also takes place if the operative surfaces of the conveyor tools 2 are made to be rough, for example, if they are provided with teeth.

So as to favor acceptance of the cut stalks by the conveyor member 3, it is possible to provide entrainment means 19 between respective neighboring conveyor tools 2, which catch any cut stalks passing in a rearward direction from the mower, and which pass the cut stalks to the outer trajectories of the conveyor tools 2 due to centrifugal action. The entrainment means 19 are, however, much shorter than the conveyor tools 2, so that they do not come into contact with the guidance means 5 even during the greatest possible immersion depth of the conveyor tools 2 into the slits 8.

As shown in FIGS. 1, 3, 4 and 5, a guide drum 21 can be disposed within a corresponding guidance member 3, and be located concentrically with the rotation axle thereof. The conveyor tools 2 can then be connected to the mantle of the guide drum 21.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. A processing apparatus for agricultural stalk-shaped products, the products being adapted to be formed into a stream of products following cutting thereof from the ground,
comprising in combination
rotatably driven conveyor means including a plurality of approximately radially outwardly extending conveyor tools separated from one another by gaps, and operatively defining a trajectory,
a guide wall having a plurality of elongate openings, cooperating with said conveyor means for guiding the products, and forming with said conveyor means a guidance channel extending transversely to said stream of products,
said guide wall intersecting said trajectory near the front end and near the rear end of said guidance channel, so that said conveyor tools project at least partially outwardly through corresponding openings in said guide wall.

2. The apparatus as claimed in claim 1, wherein a tangent to said trajectory near the front end of said guidance channel forms an acute angle with the direction of said guide wall thereat.

3. The apparatus as claimed in claim 1, further comprising mower means disposed operatively upstream of said conveyor means as viewed in a direction of forward movement of said apparatus.

4. The apparatus as claimed in claim 1, wherein each conveyor tool has an operative side adapted to come into contact with said products, said operative side having a rough surface adapted to scrape said products.

5. The apparatus as claimed in claim 1, wherein each conveyor tool has a radially outwardly converging end.

6. The apparatus as claimed in claim 5, wherein the outwardly converging end of each conveyor tool has an operative side, and a side opposite to said operative side, each of said sides having a rough surface.

7. The apparatus as claimed in claim 1, wherein said openings are slits subdividing said guide wall into a plurality of strips, and further comprising a reinforcing rib provided on each strip.

8. The apparatus as claimed in claim 1, wherein said guide wall has an inner side formed with a rough surface.

9. The apparatus as claimed in claim 1, wherein said guidance channel defines a height, and said guide wall is spaced at a selectable average distance from said conveyor means, so that the height of said guidance channel is adjustable up to and including a height at which said guide wall becomes operatively ineffective.

10. The apparatus as claimed in claim 1, wherein said guide wall is releasably mounted.

11. The apparatus as claimed in claim 1, wherein said guidance means is hingeably mounted.

12. The apparatus as claimed in claim 1, further comprising a cover normally covering said openings in said guide wall.

13. The apparatus as claimed in claim 12, wherein said cover has a rear end formed with a discharge aperture.

14. The apparatus as claimed in claim 1, further comprising entrainment means disposed between adjoining conveyor tools and projecting into said guidance channel.

15. The apparatus as claimed in claim 1, wherein said guidance channel is formed below said conveyor means.

16. The apparatus as claimed in claim 1, further comprising mower means including at least two drums, and being disposed upstream of said conveyor means, said conveyor means including an upright rotation axle so disposed that the front end of said conveyor channel is located between said drums.

17. The apparatus as claimed in claim 1, wherein said conveyor means defines an axis of rotation, and further comprising a guide drum within said conveyor means disposed concentrically with said axis of rotation.

18. The apparatus as claimed in claim 17, wherein said guide drum has a mantle, and said conveyor tools are affixed to said mantle.

* * * * *